United States Patent [19]

Oskam

[11] Patent Number: 4,462,452

[45] Date of Patent: Jul. 31, 1984

[54] SLAT APPARATUS FOR ROOF CONSTRUCTION

[75] Inventor: Herman Oskam, Bergambacht, Netherlands

[73] Assignee: Hunter Douglas International N.V., Curacao, Netherlands Antilles

[21] Appl. No.: 389,390

[22] Filed: Jun. 17, 1982

[30] Foreign Application Priority Data

Jul. 15, 1981 [NL] Netherlands ............... 8103355

[51] Int. Cl.³ .............................................. E06B 9/32
[52] U.S. Cl. ................................................ 160/176 R
[58] Field of Search ........... 160/176, 175, 166, 166 A, 160/167, 1, 7; 350/263

[56] References Cited

U.S. PATENT DOCUMENTS

| | | | |
|---|---|---|---|
| 2,874,611 | 2/1959 | Luboshez | 350/263 |
| 3,265,117 | 8/1966 | Lorentzen et al. | 160/174 |
| 4,128,307 | 5/1978 | Badertscher et al. | 160/176 R X |
| 4,313,650 | 2/1982 | Ward et al. | 160/176 R X |

FOREIGN PATENT DOCUMENTS

| | | | |
|---|---|---|---|
| 711635 | 6/1965 | Canada | 160/1 |
| 1096247 | 12/1967 | United Kingdom . | |
| 1414322 | 11/1975 | United Kingdom . | |

Primary Examiner—Ramon S. Britts
Assistant Examiner—Cherney S. Lieberman
Attorney, Agent, or Firm—Pennie & Edmonds

[57] ABSTRACT

An apparatus for regulating the radiation of light and/or heat by the use of slats which are suitable for placing under a roof constructions, such as a greenhouse roof, in which the slats 140 are supported at or adjacent each end by a pair of laterally spaced apart connecting cords 136,137. These cords form the sole suspension for the slats and are mounted, at their upper ends, on a combined tilting and carrier means 102,107,108,115. Drive 128 is provided for the combined carrier and tilting means so that the latter impart a movement from which the tilting movement of the suspended slats is directly derived. It is also possible for the slats to be drawn back by movement of runners 134,135 on the combined carrier and tilting means.

13 Claims, 10 Drawing Figures

SLAT APPARATUS FOR ROOF CONSTRUCTION

DESCRIPTION

The present invention relates to an apparatus for regulating the radiation of light and/or heat by the use of slats, which is suitable for placing under a roof construction, for example under roof glazing such as is used in greenhouse construction.

In greenhouses, where the regulation of light radiation is very important, the regulation of heat radiation is becoming increasingly important also, because the combatting of unnecessary loss of energy is of the highest priority because of the ever increasing cost of energy. The invention also contemplates the application of such regulation particularly in roof constructions, both for industrial building (storehouses, sheds and the like) and for domestic buildings, where the aim is the same. The roof constructions in question may be translucent or opaque or may be sloping wall constructions which are to be aligned therewith, the regulation of heat being applicable in the case of opaque constructions.

In one known apparatus the slats are all tiltably suspended on a number of carrier cables which extend thereabove and at right angles to the direction of the slats, and relative to which the slats are displaceable laterally with the aid of pull cables in a manner which corresponds to the operation of curtains. A construction of this kind is described in DE No. 2908330A. In this known apparatus the slat is suspended on one longitudinal edge in the lengthwise direction, while the other longitudinal edge can be pulled away substantially horizontally, by means of cords to turn around the one longitudinal edge, from a lowest position, in which the slat hangs down substantially vertically, to a height such that the passage of light through neighbouring slats is prevented. In this apparatus very great friction occurs, which must also be overcome, and the application of this system gives rise to additional costs. Moreover, for the closing of the slats the entire weight of the slats must be lifted up over almost half the width of the slats, which must then be held in that position. In addition, in order to return the slats to their substantially vertical position a counterweight is required, and this weight must then also be overcome in order to close the slats. In view of these factors, complete, uniform closing is not attainable with this known construction. Tiltability is also limited.

The present invention resides in the fact that, at the location of the carrier means, the slats are solely connected to that carrier means and individually suspended therefrom by means of pairs of connecting members, while at least one carrier means is in the form of a combined carrier and tilting means and, at the location of a combined carrier and tilting means, the connecting members of each pair are attached to the slats at two points spaced apart transverse to the length of the slats, while in addition drive means are provided for said at least one combined carrier and tilting means and impart a movement from which the tilting movement of the suspended slats is directly derived.

With such a construction, the tilting force is applied directly and via each slat and the connection is short, so that perfect, uniform closing of all the slats is achieved at the same moment. Any sagging of the carrier members in this arrangement has no effect on the position of the closing of slats relative to one another.

Preferably, in the horizontal position of the slats, the points at which the connecting members are attached to a slat, viewed in the lengthwise direction of the slat, are situated on each side of a vertical plane passing through the centre of gravity of the crosssection of the slat.

If the light radiation has to be regulated from two different but opposite angles of incidence, the connecting members may be attached to the periphery of the respective combined carrier and tilting means in such a manner that, when the driving means are operated for tilting the slat from the horizontal position, the longitudinal edges of each slat are displaced simultaneously in at least the vertical direction oppositely to one another.

It is expedient for the connecting members to consist of elongate flexible material, such as a cord or the like. In one advantageous application of the invention a connecting member consists of one single cordlike member, which half-way along its length, or thereabouts, is fastened to a carrier and tilting means. In order here again to avoid unnecessary friction as far as possible, it is expedient for the connecting members to be connected rotatably to the carrier and tilting means at the point where they are fastened thereto. Through precise selection, the dimensions of the carrier and tilting means and the width of the slats, on the one hand, and the length of the connecting members, measured at their attachment points, on the other hand, are chosen relative to one another in such a manner that there is a clearance between adjacent slats to enable them to pass one another when they are in a substantially horizontal position.

The apparatus of the invention is preferably provided with operating means for lateral displacement of the slats longitudinally of the carrier and the connecting members are fastened, on the one hand, to, or provided with, runner means adapted to move along guides on the carrier and tilting means, which extend in the lengthwise direction of the latter, and, on the other hand, the runner means or part or all of the connecting members associated with one carrier tilting means are successively connected to one another by means of spacing members with permit predetermined maximum spacing between the slats.

The runner means can be in the form of individual separate runners secured to the connecting means or can be formed on the connecting means themselves, e.g. as a knot in the connecting means.

One particular form for each combined carrier and tilting means is one in which it is rotatable about an axis which is parallel to or coincides with its longitudinal axis. With this arrangement, as the carrier and tilting means turns, the slats will always be tilted in such a manner that in a cross-section through a slat, the centre of gravity will undergo the slightest possible vertical displacement or resultant displacement.

With a carrier and tilting means of this type, the operating means are formed by a driving member which at least partially embraces the outer periphery of the carrier and tilting means and which, on the one hand, is directly or indirectly connected to the connecting member neighbouring slat and, on the other hand, is drivingly connected to an operating mechanism, such as a cord, chain, cable or the like, which is movable longitudinally of the carrier and tilting means.

Drive means for the carrier and tilting means may consist of a gear or pinion which is fastened thereon and which meshes with a toothed rack driven in known manner. In a further embodiment, the carrier and tilting means consists of an elongate member provided with two spaced guide tracks, each track having longitudinally movable thereon a plurality of runners, the runners carrying the connecting members.

However, a presently preferred combined carrier and tilting means comprises two elongate members which are movable longitudinally and/or transversely relative to one another, the pairs of connecting members of each slat being arranged so that one is connected to one of the elongate members and the other is connected to the other of said elongate members, and operating means to cause the relative movement and thus to effect the tilting of the slats.

This is a construction which is relatively inexpensive and gives little or no operational problems. Advantageously the elongate members are each in the form of elongate profiles having at least one longitudinally extending track for the runners therein, and, when each profile has two tracks, runners of alternate slats are placed in alternate ones of said tracks.

In a particularly simple construction said two elongate members are interconnected by pivotal arms articulated to each member, so that said members are spaced from one another, and one of said elongate members is fixed whereby the other member will move both longitudinally and transversely upon pivotal movement of said arms.

In order to be able to retract the slats, said operating means may include a carriage which is movable along the track of the fixed member and an actuating bar mounted on said carriage for longitudinal movement therewith to engage an element on said other member and cause the movement of said other member. Preferably an operating member is connected to the carriage, whereby longitudinal movement of the operating cord will cause the carriage to move along its track, thereby to cause the slats to open or shut relative to one another, and after the spacing members have arrested the individual slats so that they are spaced by their predetermined distance, further movement of the operating cord will cause the movement of said other member and thus cause the arms to pivot and the slats to tilt.

Such a construction gives a single operating means for tilting the slats and opening and shutting them. By "opening and shutting" is meant the act of moving the slats to and from positions in which they are "open" i.e. in a pack and "shut" when they are spaced apart from one another so that upon tilting they block radiation.

Desirably the side of the slats which faces the roof construction is provided with a surface layer having low infra-red ray emission. Such surface layer materials are well known in the art so that a detailed description would be superfluous. The slats may be slightly curved in cross-section on the operative surface, with their convex side facing the carrier and tilting means.

In order that the invention will be more fully understood, the following description is given, merely by way of example, reference being made to the accompanying drawings, in which.

The apparatus of FIGS. 1 to 6 is formed by a number of slats 1, 2, 3, 4, of which only a few are shown for the sake of clarity. These slats 1-4 are provided near their longitudinal edges with relatively small round openings 5, 6. A connecting member 7 is formed by a cord, of which one part, in the drawing, is laid around the outer periphery of a carrier and tilting means 8 and of which the end is passed through the round opening 6 and then secured. The other part of this connecting member 7 extends downwards in the vertical direction and in the same way is fastened by its end in the other round opening 5 by means of a securing member 9 fastened to the end of the cord. In addition, the carrier and tilting means 8 is in the form of a tubular section which along its periphery is provided with three longitudinal slots 10, 11 and 12, the slot 12 serving as guide for a number of runners 13, 14, 15, 16, which are movable in either longitudinal direction of the carrier and tilting means, but which are all driven in the peripheral direction when the carrier and tilting means 8 is turned. In a direction parallel to the carrier and tilting means 8, and on the left and/or right thereof, slats 1, 2, 3, 4 can also be suspended from a number of carrier and/or carrier and tilting means, the action of which, for the sake of simplicity, will not be further explained here because it corresponds entirely or partially to the arrangement illustrated.

The connecting member 7 in the example of embodiment shown in the drawing is suspended astride the outer periphery of the carrier and tilting means 8, and half-way along its length is drivably fastened to a runner, for example at 17. This has the consequence that on the rotation of the carrier and tilting means 8 counter-clockwise in the direction of the arrow A, about its longitudinal axis, the downwardly hanging vertical part is wound up, while the other part of the connecting member 7 is unwound. The slats 1, 2, 3, 4 then assume in succession a neutral horizontal intermediate position (FIG. 5), and are then further tilted to a position at an angle of 90° or substantially 90° which is the mirror image of the position shown in FIG. 1. In view of the fact that each slat 1, 2, 3, 4 is individually suspended on the carrier and tilting means 8, each slat also accurately follows the position assumed by the connecting member and is thus accurately given the same inclination at the point where the slat is situated also on the carrier and tilting means 8. Between the runners 13, 14, 15, 16 are disposed cord-like spacing means 18, 19, 20, by means of which a determined maximum mutual spacing of the runners is achieved. The length of a spacing means 18, 19, 20 may be such that the slats 1, 2, 3, 4 in their horizontal intermediate position can just make contact by their longitudinal edges with one another, without any overlapping of the edges, for example 21 and 22 in FIG. 1, occurring. In these circumstances, for the tilting of the slats it is not necessary for any additional force to be applied in order to overcome such overlapping of the edges of the slats, for the purpose of tilting to either side, so that this constitutes an additional advantage of this apparatus. However, it is also possible to allow the slats to overlap over a certain width.

Figure 1:
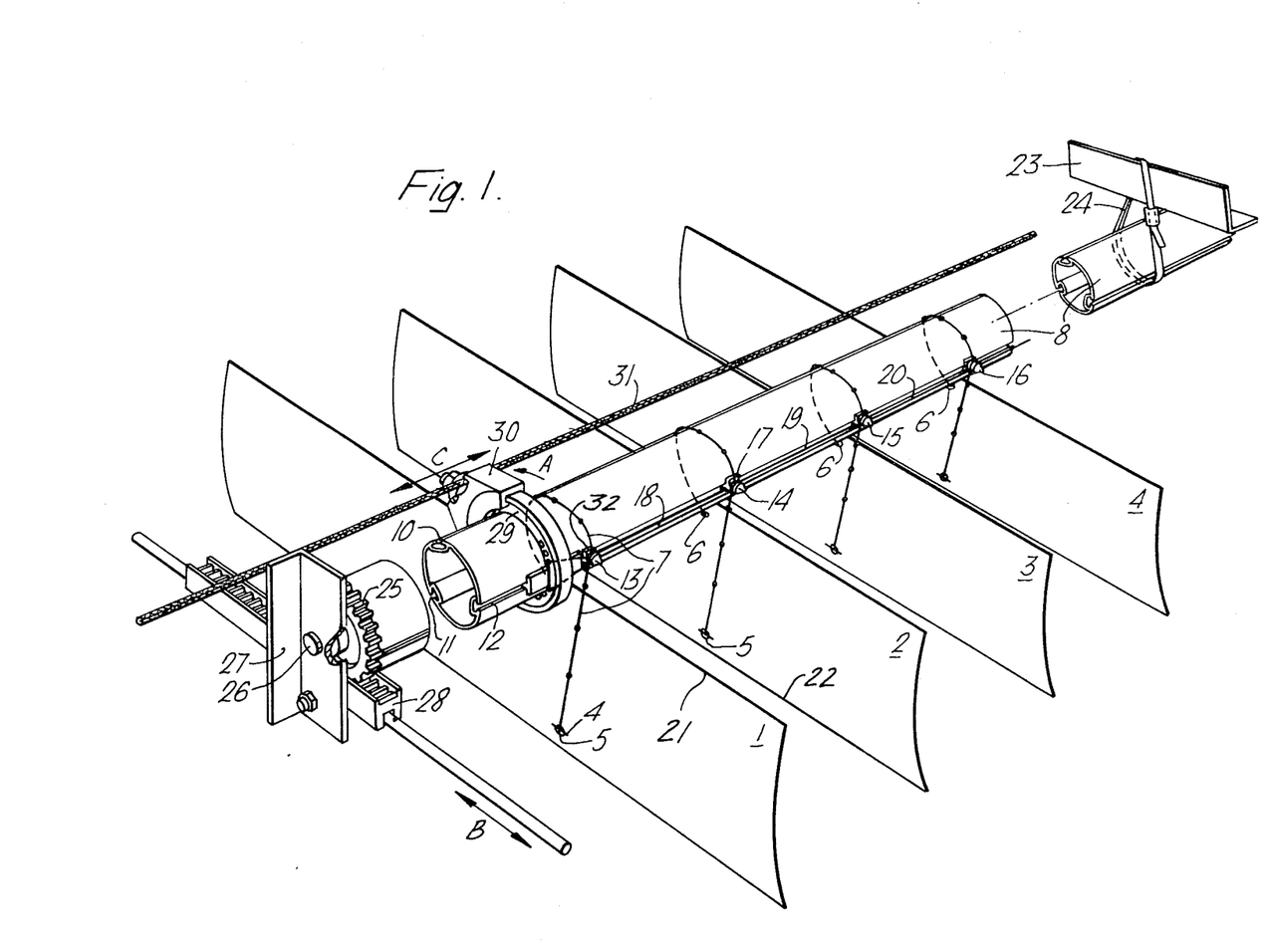
FIG. 1 is a perspective view of a part of one embodiment of apparatus according to the invention.

The carrier and tilting means 8 is simply suspended rotatably at its ends, on the one side, on a frame beam 23 of a greenhouse framework, with the aid of a suspension loop 24 of strong, wear-resistant plastics material, and on the other side there is provided, at the opposite end, a pinion 25 which is disposed with its axis of rotation in line with the longitudinal axis of the carrier and tilting means 8. The common shaft 26 is mounted for rotation in a bearing plate 27, which in turn is fastened to the greenhouse frame (not shown). The rotation of the shaft 26, and thus of the carrier and tilting means 8, is effected with the aid of a toothed rack 28 which is adapted to be moved back or forward in the direction of the arrow B and which is guided relative to the bearing plate 27 in such a manner that its teeth mesh with a number of teeth on the pinion 25. A further description of the action of the pinion 25 and rack 28 is unnecessary, as it is sufficiently well known.

The apparatus for regulating the radiation of light and/or heat by means of slats may, but need not necessarily, comprise slats which are suspended so as to be moved longitudinally of the carrier and/or tilting means. If the slats are also movable in this way, a driving member 29 in the form of a movable ring may for this purpose be disposed around the outer periphery of the carrier and tilting means 8, and the ring can be coupled by means of a rotatable clamp member 30 to a cable 31, which is used after the style of a curtain closure means or in a similar known manner. When it is desired to regulate the radiation of light and/or heat, the array of slats can be moved in the direction of the arrow C by moving the driving means 29. For this purpose it is sufficient for this driving member 29 to be coupled to a nearby slat 1 with the aid of a coupling loop 32, which forms the connection between the runner 13 and the driving member 29.

Figure 2:
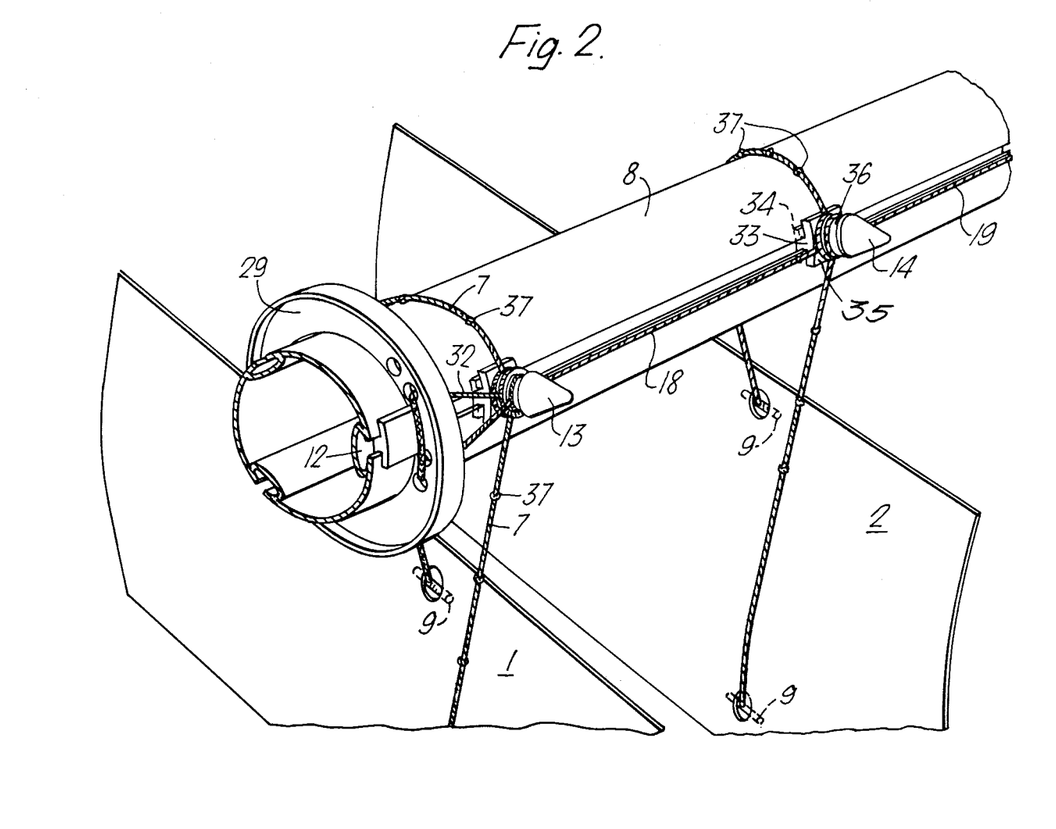
FIG. 2 shows on a larger scale a detail of a portion of the apparatus shown in FIG. 1.
Figure 3:
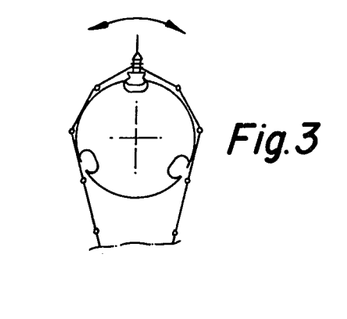
FIGS. 3 to 6 show diagrammatically in succession the effect of turning the combined carrier and tilting means for a slat.
Figure 4:
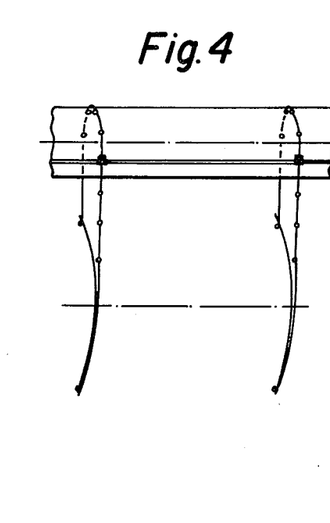
Figure 5:
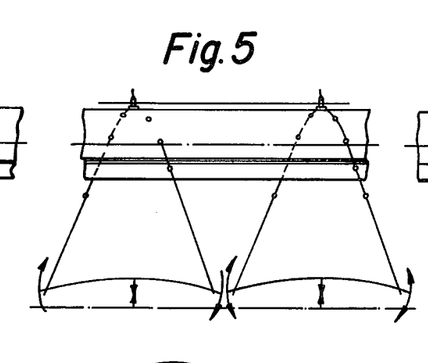
Figure 6:
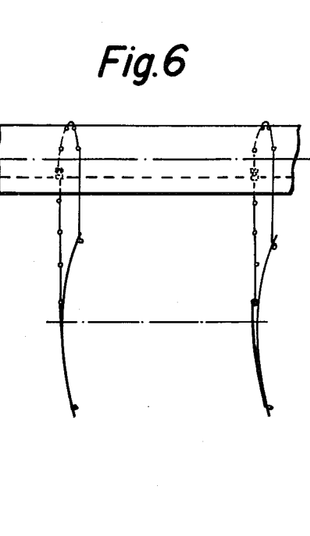

The connections between the various parts of which the apparatus is composed are shown on a larger scale for the sake of clarity in FIG. 2. The slats 1 and 2 are suspended by means of a connecting member 7 on the carrier and tilting means 8 in such a manner that on the rotation of the latter, from the position shown in the drawing, the runners 13 and 14 can be moved only over an arc of a circle. The end position of the slats is the mirror image position relative to the vertical plane through the axis of the carrier and tilting means 8, in which the slats 1 and 2 are then tilted through the horizontal intermediate position into the vertical position shown in the drawing. The runners 13 and 14 are then in their highest position on the carrier and tilting means 8.

The runners 13, 14 coincide in principle with runners which are used for curtain systems, in which movement in the lengthwise direction of a curtain rail is desired. In the embodiment illustrated, the runner 14 consists of an I-shaped section 33, of which one flange 34 is situated inside the guide 12, while the other flange 35 is situated outside the guide 12. The length of the section 33 is chosen so that a good movement in the longitudinal direction of the guide 12 is ensured, and also that when all the runners are brought together in the guide 12 the total length occupied will substantially coincide with the space occupied by the thickness of the array of vertically suspended slats. On the flange 35 a head 36, which has a two-fold function, is also provided. On the one hand the head 36 forms the fastening for the connecting member 7 which is fastened thereon half-way along its length, and on the other hand, the end of the spacing means 18, 19, 20 is fastened thereon, which spacing means have the purpose of applying the drawing force required to open the array of slats and to determine the desired spacing of the various slats. In order to restrict as much as possible the frictional forces which occur during the tilting movement of the slats, provision may be made for the fastening of the connecting member 7 on the head 36 to be effected by means of a rotatable sleeve or ring (not shown) around the axis of the head 36. Compensation can thus be effected for the rotation of the connecting member 7 relative to the position assumed, astride the carrier and tilting means 8, in relation to the position of the slats. The connecting member 7 should in fact assume, in the neutral horizontal intermediate position of the slats and in dependence on the width selected for the slats, a completely different position from that assumed when the slats are in their extreme vertical tilted positions. In the embodiment shown in the drawings, the connecting member 7 is in addition provided with spherical thickened portions 37, which provides the further advantage that the friction caused by the connecting member 7 on the carrier and tilting means 8 is reduced in comparison with a connecting member in which such thickened portions 37 are not provided. The displacement of the connecting member 7 over the outer periphery of the carrier and tilting means 8 can thus also take place more easily, because the surface of contact therewith can be relatively small, and this depends on the location of the spherical thickened portions 37 relative to one another and/or on the diameter of the thickened portions. In addition, less dirt will accumulate at the point where the "chain" is situated.

The apparatus is preferably so constructed that the length of the spacing means 18, 19, 20 substantially coincides with the width of the slats 1, 2, 3, 4, and this has the consequence that the edges of the slats are in contact with one another in the horizontal intermediate position, but do not overlap. This may be sufficient to permit use in an expedient manner of the effective surface for the regulation of light and/or heat radiation, in view of the fact that all the slats are suspended individually on the carrier and tilting means 8 and that this has the consequence that each slat also hangs accurately in the desired position corresponding to the selected tilted state of the carrier and tilting means 8. Therefore, although it is naturally possible to allow overlapping of the edges of the slats, this is not necessary as in the case of known arrangements, where such overlapping is always required in order to compensate for deviations in the tilted position, whereas in the present case no deviation in tilted position can occur with any of the slats. In view of the fact that an overlap amounting to 20% of the width of the slats is generally necessary, with the present apparatus there is a considerable saving in respect of the total area of the slats. If the apparatus according to the invention is used in a horizontal position in greenhouse construction, for an effective frame surface to be covered of $100 \times 100 = 10,000$ square meters, a saving of 20% means the apparatus will require a slat area of 2000 square meters less than a traditional apparatus. Savings of this kind are very important, and this result is achieved solely because of the certainty that every slat, not only in the horizontal intermediate position but also in all selected tilted positions, will assume the same position so that perfect regulation of light and heat is thus possible.

By giving the slats (FIG. 5) a slightly curved shape, and by installing the slat with its convex side facing the carrier and tilting means in the horizontal intermediate position, additional advantages are obtained. On the lower side of the slat in this position there will be concentrated reflection of heat radiation, and by providing the upper side of the slat with a surface layer exhibiting low radiation in the infra-red range it is possible with the apparatus constructed in this manner to obtain an optimum saving of energy. Particularly in greenhouses, in which heating costs are continually rising, the savings resulting from the installation of an apparatus according to the invention are quickly apparent.

It is clear that the apparatus for regulation of light and/or heat radiation making use of slats can be used wherever the regulation of light alone, the regulation of heat alone, or a combination of the two is required. In general, an optimum effect is achieved if the movement of air around the slats is very small, as in greenhouse buildings. If however it is desired to use the same apparatus in other industrial buildings or dwellings, under a roof construction, the same advantages are achieved.

Without departing from the principle of the invention it is possible for the carrier and tilting means to be installed not only in one and the same horizontal plane, as is the case with a horizontal installation in a greenhouse frame, but they may also be installed along an inclined roof, and it is also unnecessary for the slats to be disposed in a substantially horizontal plane. Thus, the slats can follow the sloping roof and the carrier and tilting means can then extend horizontally and lie in a common plane extending parallel to the sloping roof.

Figure 7:
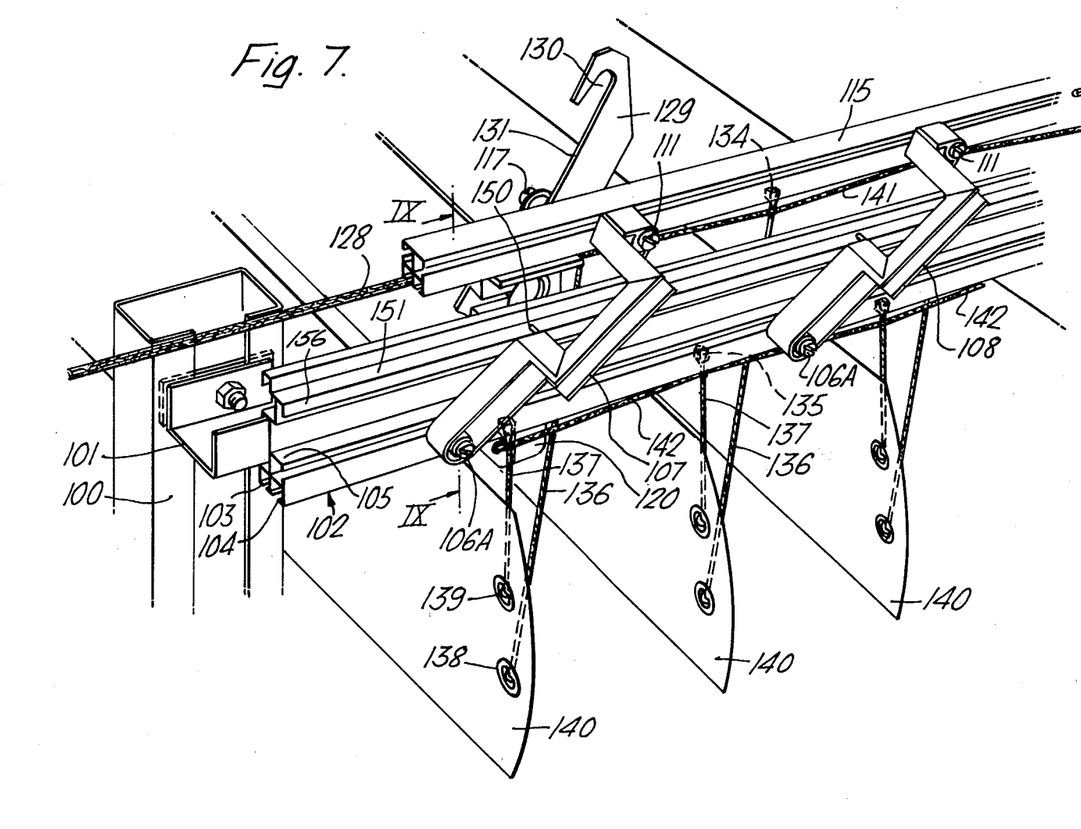
FIG. 7 is a perspective view from one side of a second and presently preferred embodiment of apparatus according to the present invention.
Figure 8:
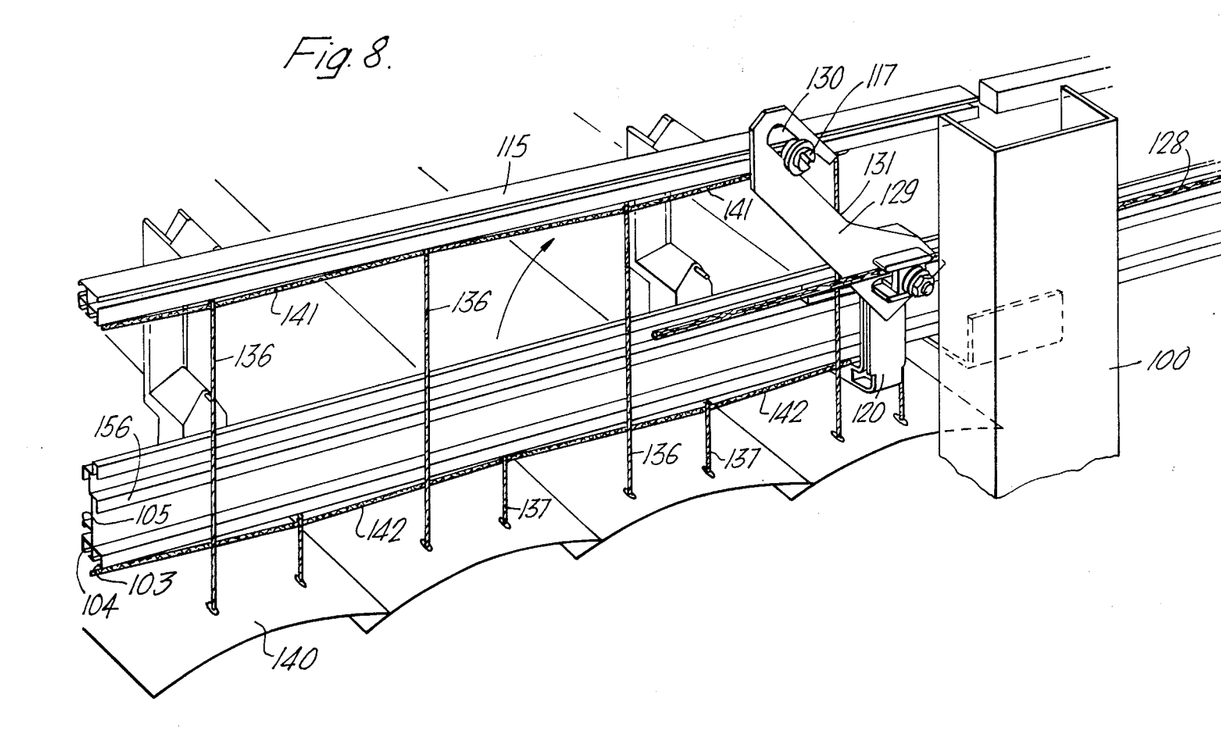
FIG. 8 is a side elevation of the apparatus of FIG. 7 from the other side.
Figure 9:
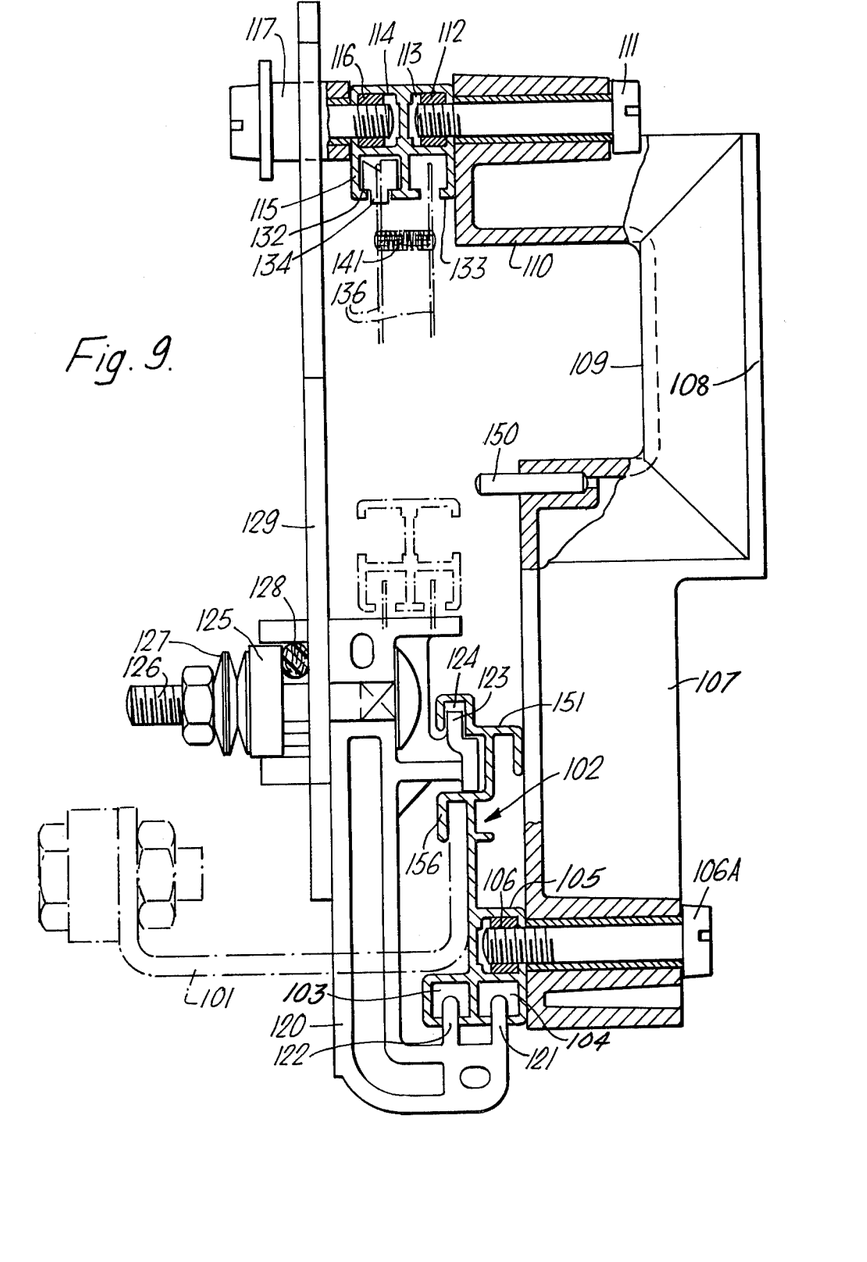
FIG. 9 is an enlarged cross-section on the line IX—IX of FIG. 7.

Referring now to the construction illustrated in FIGS. 7 to 9, the apparatus is shown mounted at one end on a support post 100 which carries a U-shaped bracket 101 which is engaged in the ends of a profile indicated by the general reference numeral 102. The profile section 102 includes two lower tracks 103,104 of inverted channel section the open lower faces of the channels having inturned flanges formed thereon spaced apart by a longitudinally extending gap. Above the track 104 is a further channel section track 105 which is open to one side, while on the opposite there is a further track defined by a down-turned flange 156 into which engages the up-turned flange of the U-shaped bracket 101. In this way the profile 102 is fixed.

Pivotally mounted by bolts 106A on sliders 106 (FIG. 9) which are movable in the track 105, are two arms 107 and 108. Now the arms 107 and 108 each have a cranked portion 109 the upper portion 110 of which is provided with an upper pivot bolt 111 threaded into a further slider 112. This slider is engaged in one of two upper channels 113,114 of an upper profiled elongate member 115. The other upper track 114 carries a slider 116 into which is threaded an actuating bolt 117.

As can be seen clearly in FIG. 9 a carriage 120 has sliders 121 and 122 axially movable in the tracks 104 and 103, the carriage also having further slider 123 axially movable in a top track 124 in the profile 102. At its rear the carriage 120 is provided with a cord clamp 125 including a bolt 126 and a belleville washer 127. This enables the carriage to be clamped to an operating cord 128. The carriage also carries an angled actuating bar 129 having an open ended elongate slot 130 at its upper end and a camming surface 131 on its right hand edge, as seen in FIG. 8.

The upper elongate member 115 has two inverted channel tracks 132 and 133 in which are slidable runners 134, while the two lower tracks 103,104 carry runners 135. There are runners in both of the tracks 132 and 133 although only one such set of runners can be seen and again there are runners in both tracks 103 and 104 although only one such runner can be seen.

Each runner 134 carries a connecting cord 136 while each runner 135 carries a connecting cord 137, the cords forming a pair of connecting members which are connected to laterally spaced apart apertures 138 and 139 formed in the slats 140. The connecting cords 136 are rather longer than the cords 137.

The connecting cords themselves are spliced into a braided spacer tape 141 and 142 and, as can be seen from FIG. 9, have an upwardly extending portion above the spacer tape connected to the respective runner. The runners associated with each spacer tape are alternately placed in the tracks 132, 133 and 103, 104 respectively.

Each arm 109 carries an abutment pin 150 which, when the arm is pivoted to a lower position, is engageable with the upper surface of a ledge 151 formed on the lower elongate member 102.

In use, assuming the slats start off in the position illustrated in FIG. 7 they are fully spaced apart and substantially vertical, the operating cord 128 is moved slightly to the left in FIG. 7, the lower spacer tape 142 being fully extended, the movement of the operating cord 128 will cause operating arm 129 to continue to move so that the surface 131 will act on the actuating bolt 117 and thus pivot the arms 107 and 108 from the position illustrated in FIG. 7 to the position illustrated in FIG. 8, that is to say so that the profile 115 is raised and moved longitudinally thus making the connecting cord 136 turn the slats 140 to the position illustrated in FIG. 8.

When the operating cord 128 is moved in the opposite direction first of all the reverse effect will take place. Then when the slats are in the position illustrated in FIG. 7, continued movement of the cord 128 to the right as seen in that Figure will cause the carriage 120 also to move to the right and this will move the first slat below the carriage against it neighbour and so on so that the slats will be opened. This will cause the spacer cord 141,142 to form loops between the slats; it is to accommodate these loops that the arms 107,108 are cranked at 109 The pivotal position of the arms during this stage is determined by the engagement of the pins 150 on the flange 151 of the lower profile.

A further embodiment which is not illustrated which is contemplated is one in which two tracks are mounted on a common elongate member which is tiltable about its own axis, the tracks carrying runners as in the embodiment of FIGS. 7 to 9. As with the construction of FIGS. 1 to 6, a tilting motion will cause the slats to tilt themselves and a carriage can be provided to move the slats back as in the construction of FIGS. 7 to 9.

Figure 10:
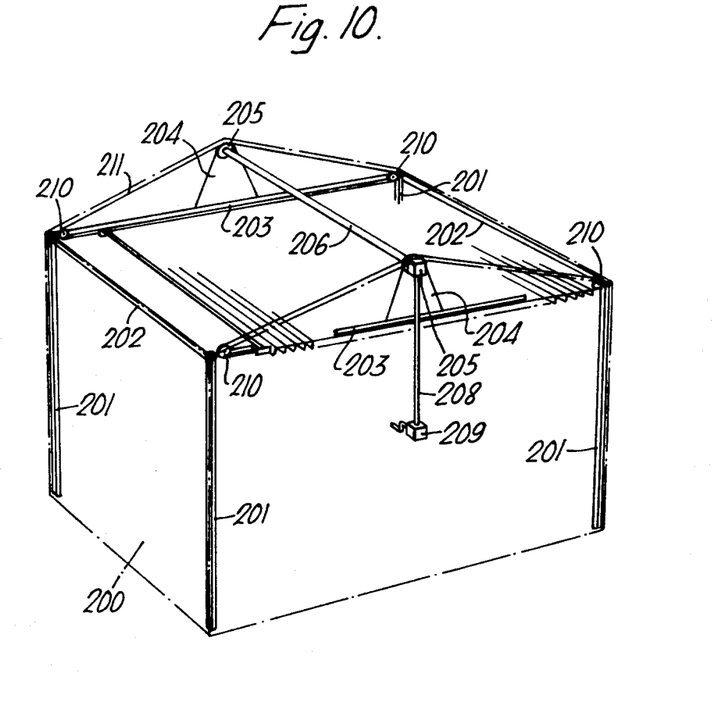
FIG. 10 is a schematic view of a greenhouse frame using the apparatus of the invention.

FIG. 10 illustrates fairly schematically a greenhouse 200 having a frame including four corner upright members 201 connected at the ends by cross members 202 and at the sides by elongate side members 203. Brackets 204 on the side members 203 support centre pulleys 205 connected by a drive rod 206 which can be driven via a gear box 207, a rod 208 and a gear box 209 with an operating handle.

Further pulleys 210 are provided at the corners and two loops of cord 211 pass around the pulleys 210 and 205, these being wrapped around the pulleys 205 to be driven thereby. The lower runs of the cords 211 will form the operating cord 31 of the FIG. 1 construction or the operating cord 128 of the FIG. 7 construction.

I claim:

1. Apparatus for regulating the radiation of light and/or heat with the aid of slats, suitable for placing under a roof construction, for example, under a translucent roof as is used in greenhouses, said apparatus comprising, in combination:
   (a) a plurality of elongate, substantially parallel, slats spaced transversely from one another;
   (b) at least two carrier means mounted above said slats and extending transversely with respect thereto;
   (c) at least one of said carrier means being in the form of a combined carrier and tilting means;
   (d) a plurality of pairs of connecting members at the location of said carrier means, whereby each slat is solely connected to the associated carrier means and individually suspended therefrom by means of pairs of connecting members and, at the location of said combined carrier and tilting means, the connecting members of each pair are attached to the slats at two points spaced apart transversely to the length of the slats; and
   (e) drive means for said at least one combined carrier and tilting means effective to impart a movement thereto from which a slat tilting movement of said slats is directly derived.

2. Apparatus as claimed in claim 1, wherein, in the horizontal position of the slat, the points at which the connecting members are attached to a slat, viewed in the lengthwise direction of the slat, are situated on each side of a vertical plane passing through the centre of gravity of the cross-section of the slat.

3. Apparatus as claimed in claim 2, wherein the connecting members are attached to the periphery of the respective combined carrier and tilting means, in such a manner that, when said drive means are operated for tilting the slat from the horizontal position, the longitudinal edges of each slat are displaced simultaneously in at least the vertical direction oppositely to one another.

4. Apparatus as claimed in claim 1, wherein said connecting members each consist of an elongate flexible material.

5. Apparatus as claimed in claim 1 wherein the dimensions of the carrier and tilting means and the width of the slats and the length of the connecting members, measured at their attachment points, are chosen relative to one another in such a manner that there is a clearance between adjacent slats to enable them to pass one another when they are in a substantially horizontal position.

6. Apparatus as claimed in claim 1, and further comprising guides extending longitudinally on said combined carrier and tilting means, runner means on each of said connecting members longitudinally displaceable on said guides, operating means for displacement of said slats longitudinally of the combined carrier and tilting means, spacer members between successive runners or successive connecting members effective to permit a predetermined maximum spacing between the slats.

7. Apparatus as claimed in claim 1, wherein each combined carrier and tilting means is rotatable about an axis which is parallel to, or coincides with its longitudinal axis.

8. Apparatus as claimed in claim 7 and further comprising guides extending longitudinally on said combined carrier and tilting means, runner means on each of said connecting members longitudinally displaceable on said guides, operating means for displacement of said slats longitudinally of the combined carrier and tilting means, spacer members between successive connecting members effective to permit a predetermined maximum spacing between the slats and wherein the operating means comprises operating cord means and a driving member which at least partially embraces the outer periphery of the carrier and tilting means, and which, is connected to the connecting member of a neighbouring slat and, is drivingly connected to said operating cord means, which is movable longitudinally of the carrier and tilting means.

9. Apparatus as claimed in claim 1 wherein the combined carrier and tilting means comprises two elongate members which are movable relative to one another, the pairs of connecting members of each slat being arranged so that one is connected to one of the elongate members and the other is connected to the other of said elongate members, and operating means to cause the relative movement and thus to effect the tilting of the slats.

10. Apparatus as claimed in claim 9 and further comprising guides extending longitudinally on said combined carrier and tilting means, runner means on each of said connecting members longitudinally displaceable on said guides, operating means for displacement of said slats longitudinally of the combined carrier and tilting means, spacer members between successive connecting members effective to permit a predetermined maximum spacing between the slats, and wherein said elongate members are each in the form of elongate profiles having at least one longitudinally extending track for the runners therein, and, when each profile has two tracks, the runners of alternate slats are placed in alternate ones of said tracks.

11. Apparatus as claimed in claim 9, and further comprising pivotal arms articulated to each of said two elongate members, so that said members are spaced from one another and one of said elongate members is fixed, whereby the other member will move both longitudinally and transversely upon pivotal movement of said arms.

12. Apparatus as claimed in claim 11, wherein said operating means includes a carriage which is movable along the track of the fixed member and further comprising an actuating bar mounted on said carriage for longitudinal movement therewith and an element on said member engageable by said actuating bar to cause the movement of said other member.

13. Apparatus as claimed in claim 12, and further comprising guides extending longitudinally on said combined carrier and tilting means, runner means on each of said connecting members longitudinally displaceable on said guides, operating means for displacement of said slats longitudinally of the combined carrier and tilting means, spacer members between successive runners or successive connecting members effective to permit a predetermined maximum spacing between the slats, and wherein said elongate members are each in the form of elongate profiles having at least one longitudinally extending track for the runners therein, and, when each profile has two tracks, the runners of alternate slats are placed in alternate ones of said tracks and an operating cord connected to the carriage, whereby longitudinal movement of the operating cord will cause the carriage to move along the track, thereby to cause the slats to open or shut relative to one another, and after the spacing members have arrested the individual slats so that they are spaced by their predetermined distance, further movement of the operating cord will be effective to cause the movement of said other member, and thus cause said arms to pivot and the slats to tilt.

* * * * *